United States Patent [19]

Ward

[11] 4,132,397

[45] Jan. 2, 1979

[54] MOUNTING BRACKET FOR A PIPE CLAMP

[76] Inventor: Emerson Ward, 804 Perry, Wichita, Kans. 67203

[21] Appl. No.: 826,530

[22] Filed: Aug. 22, 1977

[51] Int. Cl.[2] .......... A47H 1/14; B23Q 3/02

[52] U.S. Cl. .......... 269/252; 248/201; 248/251

[58] Field of Search .......... 248/201, 262, 220.1, 248/219 R, 300, 71, 65, 536, 251; 269/102, 95, 321 S, 252; 211/123; 52/714

[56] References Cited

U.S. PATENT DOCUMENTS

| | | | |
|---|---|---|---|
| 720,938 | 2/1903 | Lindhorst | 211/123 UX |
| 820,702 | 5/1906 | Covert | 52/714 X |
| 3,189,341 | 6/1965 | Maurus | 269/321 S |

FOREIGN PATENT DOCUMENTS

| | | | |
|---|---|---|---|
| 59568 | 1/1947 | Netherlands | 269/95 |

*Primary Examiner*—J. Franklin Foss

*Attorney, Agent, or Firm*—John H. Widdowson

[57] ABSTRACT

A mounting bracket for a pipe clamp. The bracket supporting a standard pipe clamp attached to a section of pipe on an object such as a work bench, saw horse, cabinet, or the like, and converting the pipe clamp into a stationary clamp or vise.

4 Claims, 3 Drawing Figures

MOUNTING BRACKET FOR A PIPE CLAMP

BACKGROUND OF THE INVENTION

This invention relates generally to a mounting bracket, and more particularly, but not by way of limitation, to a mounting bracket for supporting a pipe clamp attached to a section of pipe.

Heretofore, pipe clamps have been used for securing various articles therebetween with the clamp attached to sections of pipe having various diameters. There has been no means of attaching the section of pipe to a stationary object for supporting the clamp thereon.

Heretofore, there have been various types of vises, door clamps, and other designs of clamps used for securing to a table, work bench, or the like. There are also prior art wrenches which can be converted to a vise. None of the prior art vises and clamps provide means for supporting a pipe clamp attached to a section of pipe.

SUMMARY OF THE INVENTION

The subject invention provides a mounting bracket for securing a standard pipe clamp attached to a section of pipe and converting the pipe clamp to a stationary clamp or vise.

The mounting bracket is simple in design, rugged in construction, and provides a bracket for quickly mounting a standard pipe clamp attached to a section of pipe thereon.

The mounting bracket may be attached to a stationary object such as a work bench, saw horse, cabinet, or may be made portable by attaching to a section of dimensional lumber thereby providing a portable clamp or vise.

The mounting bracket includes an elongated flat first support arm and second support arm. The support arms include a first end portion with apertures therethrough for receiving the opposite ends of a section of pipe. The section of pipe is attached to a standard pipe clamp. The support arms further include a second end portion having smaller apertures therethrough for receiving threaded screws or the like for attaching the arms to a stationary object. A pair of threaded nuts are disposed on both sides of the aperture in the first end portion of the first support arm for securing one end of the pipe thereto.

The advantages and objects of the invention will become evident from the following detailed description when read in conjunction with the accompanying drawings which illustrate the preferred embodiments of the invention.

Figure 1:
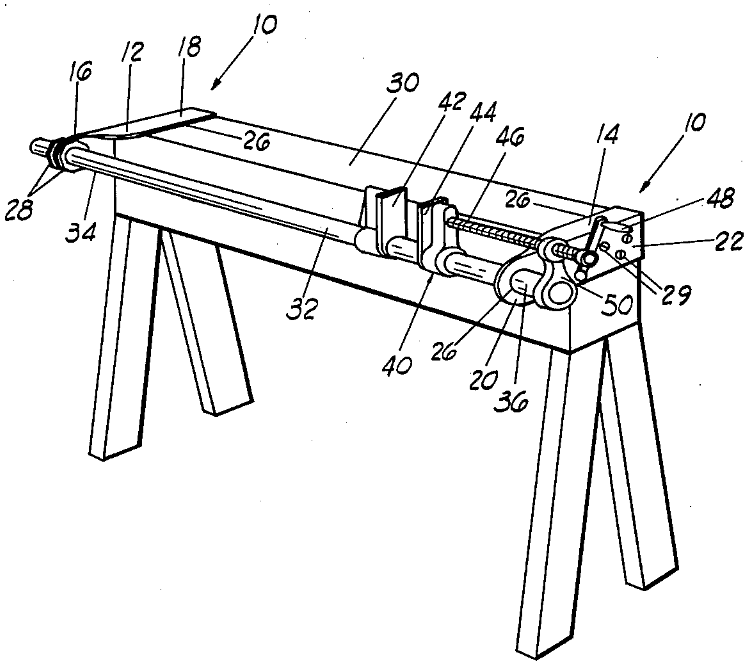
FIG. 1 is a perspective view of the mounting bracket mounted horizontally to a saw horse.

In FIG. 1, the mounting bracket for a pipe clamp is designated by general reference numeral 10. The bracket 10 includes a first support arm 12 and a second support arm 14. The arms 12 and 14 are made of flat, elongated sheet metal or any other similar material. The first support arm 12 includes a first end portion 16 and a second end portion 18. The second support arm 14 includes a first end portion 20 and a second end portion 22. The support arms 12 and 14 further include a flange portion 26 attached to one side of the arms 12 and 14 extending along the length thereof and at right angles thereto.

Figure 2:
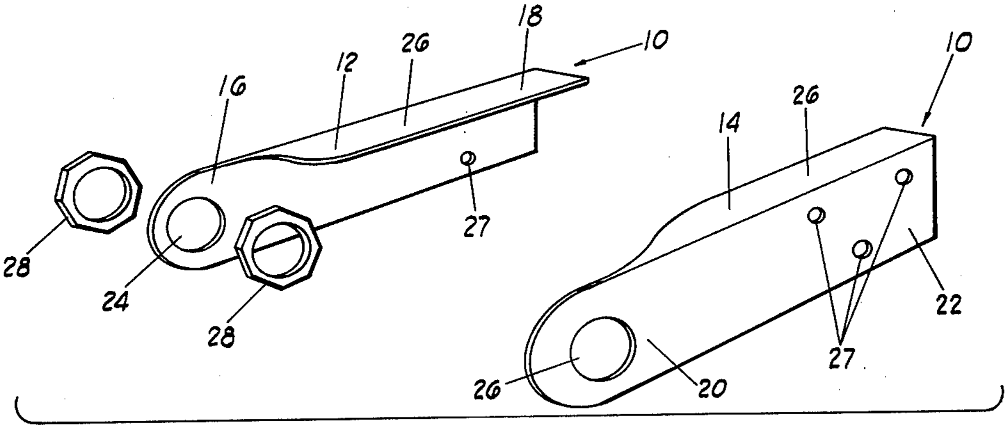
FIG. 2 is a perspective view of the mounting bracket.

The first support arm 12 includes an aperture 24 in the first end portion 16. The aperture 24 is shown in FIG. 2. The second support arm 14 includes an aperture 26 in the first end portion 20. The second end portions 18 and 22 of the arms 12 and 14 include a plurality of apertures 27 shown in FIG. 2 for receiving threaded screws 29. The bracket 10 further includes a pair of threaded nuts 28 disposed on both sides of the aperture 24 in the first end portion 16 of the support arm 12. In FIG. 1, the bracket 10 can be seen mounted horizontally at both ends of a saw horse 30. While the saw horse 30 is shown, it should be appreciated that a work bench, table, cabinet, or any other similar object could be used for supporting the bracket 10. The apertures 24 and 26 in the first and second arms 12 and 14 receive the opposite ends of a section of pipe 32 therethrough. A first end 34 of the pipe 32 is threaded and secured to the first support arm 12 by the threaded nuts 28. A second end 36 of the pipe 32 is slidably received through the aperture 26 in the second support arm 14.

Mounted on the pipe 32 is a standard pipe clamp 40 having a fixed jaw 42 and an adjustable jaw 44 connected to a threaded screw 46. The screw 46 is attached to a handle 48 and supported on the pipe 40 by a screw support arm 50.

In FIG. 2, a perspective view of the bracket 10 is shown in detail. In this view, the flange portion 26 of the arms 12 and 14 can be seen tapered inwardly and ending above the apertures 24 and 26 in the first end portions 16 and 20 of the arms 12 and 14. This provides room for easily inserting the pipe 40 through the apertures 24 and 26 and securing the end 34 of the pipe 32 to the threaded nuts 28. The flange portion 26 provides additional strength in the structural design of the support arms 12 and 14 and also prevents the exposure of a sharp edge thereby eliminating the chance of snagging clothing or cutting a persons hand during the use of the pipe clamp 40.

Figure 3:
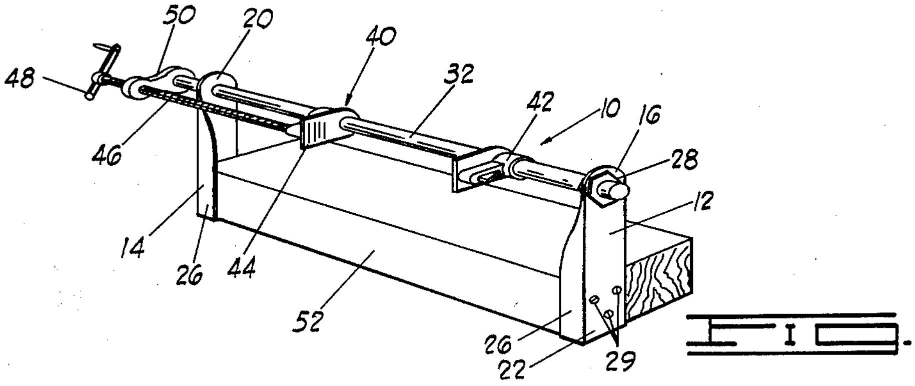
FIG. 3 is a perspective view of the mounting bracket used for providing a portable clamp or vise.

In FIG. 3 an alternate embodiment of the bracket 10 is shown wherein the bracket 10 is attached to a section 52 of dimensional lumber converting the pipe clamp 40 to a portable clamp or vise. In this view, the support arms 12 and 14 are mounted vertically to the ends of the lumber section 52 by the screws 29. The clamp 40 is attached to the pipe 32 and held in an upright position on the first end portions 16 and 20 of the support arms 12 and 14.

Changes may be made in the construction and arrangement of the parts or elements of the embodiments as disclosed herein without departing from the spirit or scope of the invention as defined in the following claims.

I claim:

1. In combination a pipe clamp and a mounting bracket therefor comprising:
   - a pipe member;
   - a screw support arm attached to an end of said pipe and including a threaded aperture;
   - a fixed jaw vise member secured to said pipe;
   - an adjustable jaw vise member slidably engaging said pipe;

a threaded bar member connected to said adjustable jaw vise member and rotatably engaging said threaded aperture of said screw support arm;

means for rotating said threaded bar to slide said adjustable bar towards or away from said fixed jaw vise member;

a first support arm having a first end portion and a second end portion, the first end portion having an aperture therethrough, the aperture dimensioned to receive one end of the pipe;

means for securing the end of the pipe to the first end portion of said first support arm;

a second support arm having a first end portion and a second end portion, the first end portion having an aperture therethrough, the aperture dimensioned to receive the other end of the pipe;

the second end portions of said first support arm and said second support arm attached to a stationary object such as a work bench, saw horse, cabinet, and the like, for supporting the mounting bracket thereon;

said first support arm and said second support arm include a flange portion disposed along one side of said arms and longitudinally along the length thereof; and said aperture of said first end portions of said second support arm receives said pipe between said screw support arm and said adjustable jaw vise member.

2. The combination as described in claim 1, wherein means for securing the end of the pipe to the first end portion of said first support arm is a pair of threaded nuts disposed on either side of the aperture in the first end portion of said first support arm and threadably engaging the end of the pipe and securing the pipe to the first end portion of said first support arm.

3. The combination as described in claim 2, wherein the flange portion along the side of said first support arm and said second support arm is tapered inwardly and ending adjacent to and above the aperture in the first end portion of said first support arm and said second support arm.

4. The combination as described in claim 3, wherein the second end portion of said first support arm and said second support arm include apertures therethrough for receiving screws or the like therethrough in attaching said support arms to the stationary object.

* * * * *

UNITED STATES PATENT AND TRADEMARK OFFICE

CERTIFICATE OF CORRECTION

PATENT NO. : 4,132,397

DATED : January 2, 1979

INVENTOR(S) : Emerson W. Ard

It is certified that error appears in the above-identified patent and that said Letters Patent are hereby corrected as shown below:

IN THE TITLE

[76] Delete "Emerson Ward", and insert therefor ---Emerson W. Ard---.

Signed and Sealed this

***Tenth* Day of *April 1979***

[SEAL]

*Attest:*

RUTH C. MASON
*Attesting Officer*

DONALD W. BANNER
*Commissioner of Patents and Trademarks*